United States Patent [19]

Kurakake et al.

[11] Patent Number: 5,010,492
[45] Date of Patent: Apr. 23, 1991

[54] SPINDLE CONTROL SYSTEM AND NUMERICAL CONTROL APPARATUS

[75] Inventors: Mitsuo Kurakake, Hino; Jiro Kinoshita, Minamitsuru, both of Japan

[73] Assignee: Fanuc Ltd, Minamitsuru, Japan

[21] Appl. No.: 343,150

[22] PCT Filed: Aug. 31, 1988

[86] PCT No.: PCT/JP88/00875
  § 371 Date: Apr. 17, 1989
  § 102(e) Date: Apr. 17, 1989

[87] PCT Pub. No.: WO89/02104
  PCT Pub. Date: Mar. 9, 1989

[30] Foreign Application Priority Data
  Sep. 2, 1987 [JP] Japan .................. 62-220013

[51] Int. Cl.$^5$ .................................. G05B 19/407
[52] U.S. Cl. .................. 364/474.29; 318/603; 318/615; 364/474.3
[58] Field of Search .......... 364/474.29, 474.12, 364/474.02, 474.3, 174; 318/603, 615–618, 625, 636, 677

[56] References Cited

U.S. PATENT DOCUMENTS

| | | | |
|---|---|---|---|
| 4,237,408 | 12/1980 | Frecka | 364/474.12 X |
| 4,386,407 | 5/1983 | Hungerford | 364/474.3 |
| 4,535,277 | 8/1985 | Kurakake | 318/616 X |
| 4,611,155 | 9/1986 | Kurakake | 318/603 |
| 4,622,504 | 11/1986 | Yamazaki | 318/615 X |

Primary Examiner—Joseph Ruggiero
Attorney, Agent, or Firm—Staas & Halsey

[57] ABSTRACT

A spindle control system for a numerical control apparatus (CNC). A servo control circuit (10) includes a microprocessor (11), a memory (12), and two counters (13, 15) for counting pulses from encoders, and is connected to a CNC bus (1). A power amplifier (21) is able to receive a command from the servo control circuit (10) and control the rotation of a spindle motor, and a separate encoder (25) is able to feed pulses back to the counter (13) for contour control, and is coupled to a spindle. The counter (13) of the servo control circuit (10) is used to detect the rotational position of the spindle motor (22), whereas the other counter (15) counts the feedback pulses for thread cutting or the like. Therefore, the servo control circuit (10) can control both the position and rotation of the spindle motor (22).

2 Claims, 2 Drawing Sheets

SPINDLE CONTROL SYSTEM AND NUMERICAL CONTROL APPARATUS

BACKGROUND OF THE INVENTION

1. Field of the Invention

The present invention relates to a spindle control system for a numerical control apparatus, and more particularly, to a spindle control system in which a contour control is carried out by a spindle.

2. Description of the Related Art

Contour control by a spindle is conducted while controlling the position of the spindle, to carry out a complicated grooving or machining of a cam, etc., when using a lathe or the like. A prior art system for carrying out the spindle contour control uses a contour control servomotor, and a clutch for connecting the spindle to a spindle amplifier for spindle rotation or to the contour control servomotor.

The prior art system, however, requires a special servomotor for controlling a spindle motor, and a clutch or the like for a changeover between the spindle motor and the servomotor, and thus the entire system has a complicated structure.

SUMMARY OF THE INVENTION

The object of the present invention is to solve the above problems and provide a spindle control system in which the speed control and position control of a spindle motor are executed at the same time.

To solve the aforementioned problems, according to a first embodiment, there is provided a spindle control system for a numerical control apparatus (CNC), which comprises a servo control circuit including a microprocessor, a memory, and two counters for counting pulses from encoders, and connected to a CNC bus, a power amplifier able to receive a command from the servo control circuit and control the rotation of a spindle motor, and a separate encoder able to feed pulses back to the counter for contour control and coupled to a spindle.

According to a second embodiment, there is provided a numerical control apparatus for controlling a spindle motor and a servomotor, which comprises a servo control circuit including a microprocessor, a memory, and two counters for counting pulses from encoders, and connected to a CNC bus, a power amplifier able to receive a command from the servo control circuit and control the rotation of the spindle motor, and a separate encoder able to feed pulses back to the counter for contour control and coupled to a spindle, the servo control circuit being adapted to drive the servomotor by changing only the software.

One of the counters of the servo control circuit is used to detect the rotational position of the spindle motor, and the other counter counts the feedback pulses for thread cutting or the like.

Accordingly, the servo control circuit can carry out both the position control and rotation control of the spindle motor, and thus it is unnecessary to provide an extra servomotor for the position control or a clutch for changeover between the servomotor and the spindle motor, and the like, whereby, the contour control by the spindle motor can be carried out with a simplified structure.

Further, since two counters capable of counting the feedback pulses are provided, the servo control circuit can be used to control a servomotor other than the spindle motor, and therefore, the same hardware can be used for controlling both the servomotor and the spindle motor, and thus a numerical control apparatus including a common servo control circuit can be provided.

DESCRIPTION OF THE PREFERRED EMBODIMENT

One embodiment of the present invention will now be described with reference to the drawings.

Figure 1:
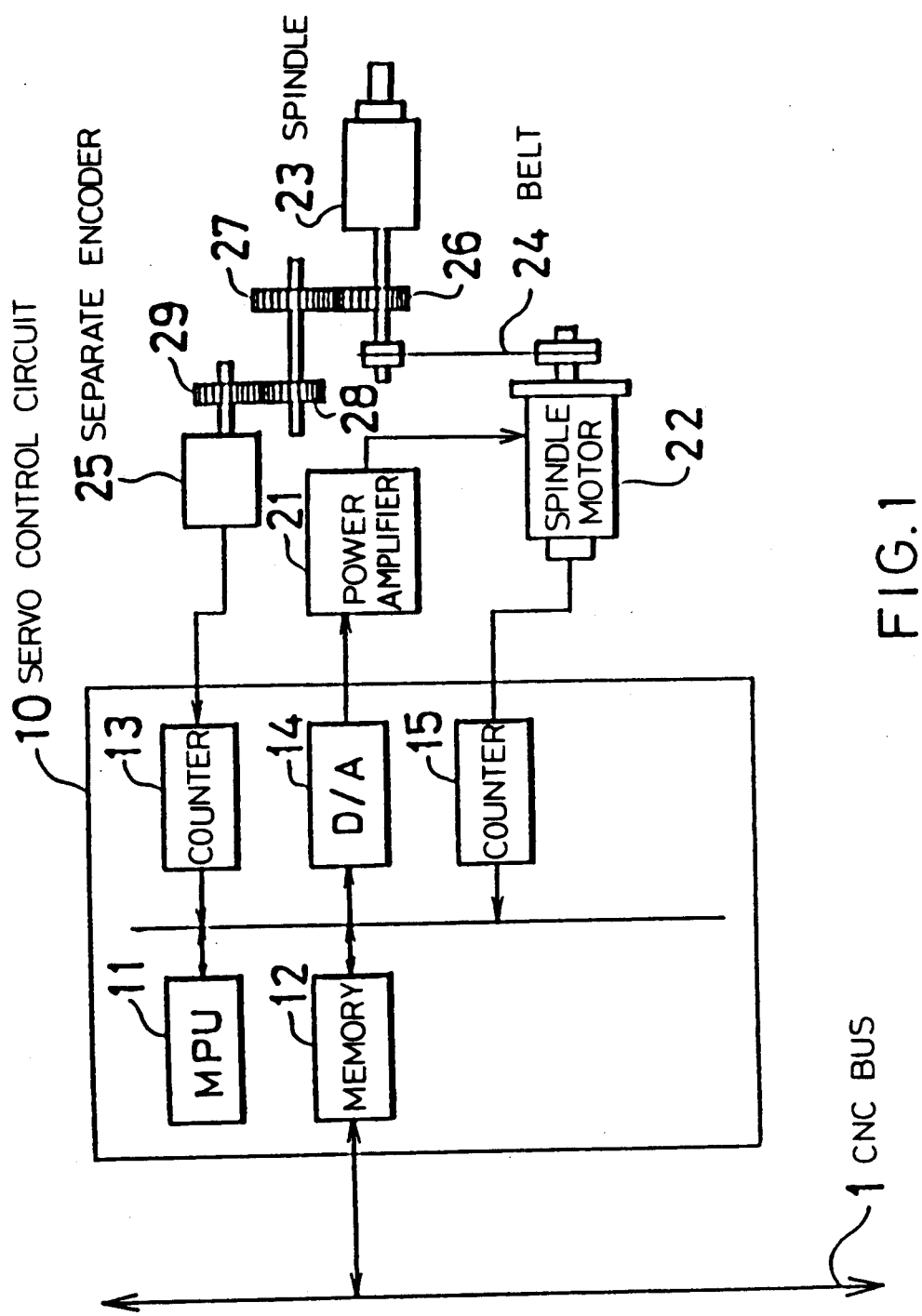
FIG. 1 is a block diagram of a spindle control system according embodiment of the present invention.

FIG. 1 is a block diagram of a spindle control system according to the embodiment of the present invention. In the figure, numeral 1 denotes a CNC bus for transmitting a signal from a numerical control apparatus (CNC), not shown; 10 denotes a servo control circuit for controlling the position and speed of a spindle motor, 11 denotes a processor for globally controlling the servo control circuit 10; and 12 denotes a memory, which is composed of a ROM for storing a control program and a RAM for storing data. Data is transmitted between the memory 12 and the CNC through the CNC bus 1.

Numeral 13 denotes a counter for counting pulses from a separate encoder mentioned hereinafter, the content of the counter being read out by the processor 11 and utilized to detect the number of rotations of the spindle for thread cutting or the like; 14 denotes a DA converter for converting a digital speed command into an analog output; and 15 denotes a counter which counts pulses from an encoder built in a spindle motor referred to hereinafter, and is used to control the rotational position of the spindle motor.

Numeral 21 denotes a power amplifier which amplifies a command from the DA converter 14 to control the rotation of the spindle motor; 22 denotes the spindle motor for driving the spindle described hereinafter; and 23 denotes the spindle to which a workpiece is attached through a chuck, not shown, for turning and machining the workpiece. The spindle motor 22 and spindle are coupled by a belt 24.

Numeral 25 denotes the aforementioned separate encoder, which is coupled to the spindle 23 by gears 26, 27, 28, and 29 and produces and sends pulses corresponding to the rotations of the spindle 23 to the counter 13.

According to this arrangement, the position of the spindle 23 can be controlled by using the counter 15 to count the pulses of the encoder built in the spindle motor 22. The pulses corresponding to the rotations of the spindle 23 are sent to the counter 13 from the separate encoder 25, to control the speed of rotation. These control operations are executed by the processor 11 in accordance with the control program stored in the ROM in the memory 12.

Accordingly, the spindle contour control can be conducted with a simplified structure which does not require a special servomotor and a clutch and the like.

Next, an example of using the servo control circuit to control a servomotor will be described with reference to FIG. 2.

In the figure, numeral 1 denotes a CNC bus for transmitting a signal from a numerical control apparatus (CNC), not shown; 10 denotes the servo control circuit for controlling the position and speed of the servomotor, numeral 11 denotes the processor for globally controlling the servo control circuit 10; and 12 denotes the memory including a ROM for storing a control program and a RAM for storing data. Data is transferred between the memory 12 and the CNC through the CNC bus 1. In this case, a different control program from that used for controlling the aforementioned spindle motor is stored in the ROM.

Numeral 13 denotes the counter for counting pulses from an optical scale described hereinafter. The content of the counter is read out by the processor 11 and is used to detect a machine position, to thereby enable an accurate positioning control; 14 denotes the DA converter for converting a digital speed command into an analog output; and 15 denotes the counter which counts pulses from an encoder built in the servomotor referred to hereinafter and used to control the rotational position of the servomotor.

Numeral 31 denotes a power amplifier, which amplifies a command from the DA converter 14 to control the rotation of the servomotor; 32 denotes the servomotor for rotating a ball screw 33 to move a table 34; and 35 denotes the optical scale for converting machine movement into pulses which are sent to the counter 13.

In this arrangement, the optical scale 35 converts machine movement directly into pulses, and the counter 13 counts the pulses whereby the machine movement is directly detected. The counter 15 is used to control the speed of the servomotor 32, by counting feedback pulses from the encoder built in the servomotor 32. Accordingly, the same hardware can be used for controlling both the spindle motor and the servomotor; of course, different software is used in the memory 12 for these processes.

Figure 2:
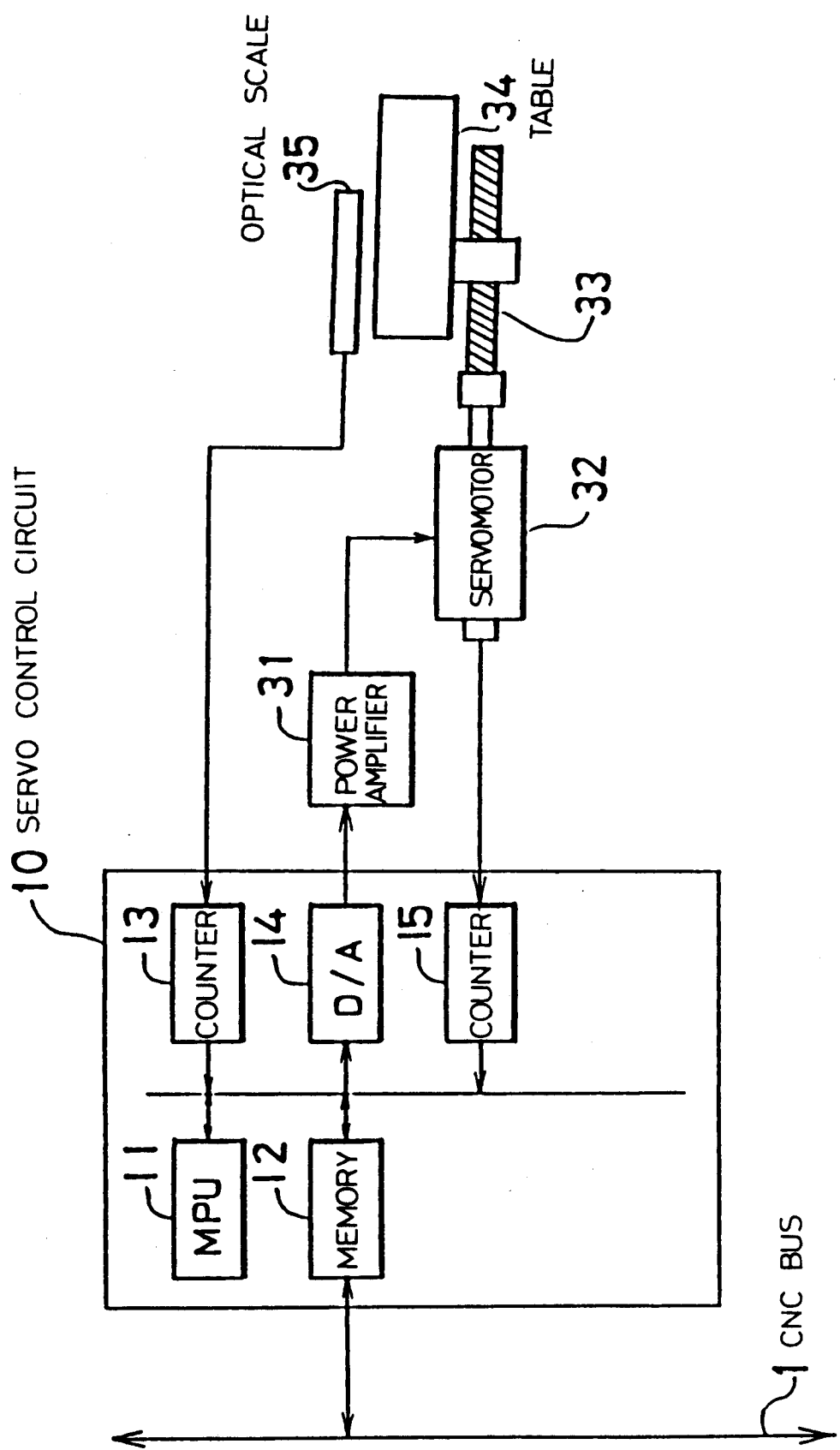
FIG. 2 is a block diagram of an example of a system which controls of a servomotor by a servo control circuit.

Furthermore, the servo control circuit 10 shown in FIG. 1 may be used for controlling the spindle motor and the servo control circuit 10 of FIG. 2 may be used for controlling the servomotor, so that a numerical control apparatus (CNC) system in which both the spindle motor and the servomotor are controlled by the same hardware can be realized.

According to the present invention, as described above, one of the counters of the servo control circuit is used to detect the rotational position of the spindle motor, whereas the other counter is used to count the feedback pulses for thread cutting or the like. Accordingly, the servo control circuit can control both the position and rotation of the spindle motor, and therefore, is not necessary to provide an extra servomotor for the position control or a clutch for the changeover between the servomotor and the spindle motor, etc., and thus the contour control by the spindle motor can be carried out with a simplified structure.

Moreover, since two counters capable of counting the feedback pulses are used, the servo control circuit can be used to control a servomotor other than the spindle motor. Accordingly, the same hardware can be used for controlling both the servomotor and the spindle motor, and thus a numerical control apparatus including a common servo control circuit can be realized.

What is claimed is:

1. A spindle control system for a numerical control apparatus (CNC) including a CNC bus, a spindle, and a spindle motor which produces pulses, comprising:
   a servo control circuit, coupled to the CNC bus, for providing a command, said servo control circuit including:
      a microprocessor;
      a memory coupled to said microprocessor; and
      first and second counters for counting pulses, said second counter coupled to the spindle motor to count the pulses produced by the spindle motor;
   a power amplifier, a coupled to said servo control circuit and the spindle motor, for receiving the command from said servo control circuit and for controlling the rotation of the spindle motor; and
   a separate encoder, coupled to said first counter and the spindle, for feeding back pulses to said first counter for contour control.

2. A numerical control apparatus, including a CNC bus and a spindle, for controlling a spindle motor and a servomotor, comprising:
   a servo control circuit, coupled to the CNC bus, for providing a command, said servo control circuit including:
      a microprocessor for processing a numerical control program;
      a memory coupled to said microprocessor; and
      first and second counters, coupled to said microprocessor, for counting pulses, said second counter coupled to the spindle motor to count the pulses produced by the spindle motor;
   a power amplifier, coupled to said servo control circuit, for receiving the command from said servo control circuit and for controlling the rotation of the spindle motor; and
   a separate encoder, coupled to said first counter and the spindle, for feeding back pulses to said first counter for contouring control, said servo control circuit being adapted to drive the servomotor through said power amplifier by changing only the numerical control program.

* * * * *

UNITED STATES PATENT AND TRADEMARK OFFICE
CERTIFICATE OF CORRECTION

PATENT NO. : 5,010,492

DATED : APRIL 23, 1991

INVENTOR(S) : MITSUO KURAKAKE ET AL.

It is certified that error appears in the above-identified patent and that said Letters Patent is hereby corrected as shown below:

Col. 4, line 25, "a coupled" should be --coupled--.

Signed and Sealed this

Fifteenth Day of September, 1992

Attest:

DOUGLAS B. COMER

Attesting Officer

Acting Commissioner of Patents and Trademarks